(12) United States Patent
Isomura et al.

(10) Patent No.: US 10,204,462 B2
(45) Date of Patent: Feb. 12, 2019

(54) DRIVE DIAGNOSIS DEVICE, DRIVE DIAGNOSIS SYSTEM AND TERMINAL DEVICE

(71) Applicant: Hitachi, Ltd., Tokyo (JP)

(72) Inventors: Yosuke Isomura, Tokyo (JP); Kenji Suzuki, Tokyo (JP); Yoshifumi Izumi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1 day.

(21) Appl. No.: 15/469,131

(22) Filed: Mar. 24, 2017

(65) Prior Publication Data
US 2017/0287238 A1    Oct. 5, 2017

(30) Foreign Application Priority Data

Mar. 30, 2016    (JP) ................................. 2016-068612

(51) Int. Cl.
  *G07C 5/00*    (2006.01)
  *G07C 5/08*    (2006.01)
  *G06Q 40/08*    (2012.01)
(52) U.S. Cl.
  CPC .......... *G07C 5/0808* (2013.01); *G06Q 40/08* (2013.01); *G07C 5/008* (2013.01); *G07C 5/0825* (2013.01)
(58) Field of Classification Search
  CPC .............. G07C 5/0808; G07C 5/0825; B60W 2540/30; B60W 2540/22; G06Q 40/08
  See application file for complete search history.

(56) References Cited

U.S. PATENT DOCUMENTS

| | | | | |
|---|---|---|---|---|
| 8,660,785 B2* | 2/2014 | Sato | ............... | B60R 16/0236 |
| | | | | 701/123 |
| 9,174,652 B2* | 11/2015 | Chang | ............... | B60W 50/14 |
| 9,586,591 B1* | 3/2017 | Fields | ............... | B60W 40/09 |
| 2013/0184928 A1* | 7/2013 | Kerkhof | ............... | G07C 5/0808 |
| | | | | 701/29.1 |
| 2014/0272811 A1 | 9/2014 | Palan | | |
| 2014/0365070 A1* | 12/2014 | Yano | ............... | G07C 5/0808 |
| | | | | 701/33.4 |
| 2015/0006132 A1 | 1/2015 | Matsumura | | |
| 2018/0050698 A1* | 2/2018 | Polisson | ............ | B60W 30/182 |

FOREIGN PATENT DOCUMENTS

| | | | |
|---|---|---|---|
| JP | 5510471 B2 | | 6/2014 |
| JP | 2015-141536 | * | 8/2015 |
| WO | WO-2013/137885 A1 | | 9/2013 |

OTHER PUBLICATIONS

IPCOM000225832D; "System, Method, Computer Program for Analyzing a User's Driving Behavior"; ip.com Prior Art Database Tech. Discl.; Publ.: Mar. 7, 2013.*
Extended European Search Report issued in corresponding application No. 17 16 3714 dated Aug. 21, 2017.

* cited by examiner

*Primary Examiner* — Michael J Zanelli
(74) *Attorney, Agent, or Firm* — Foley & Lardner LLP

(57) ABSTRACT

A drive diagnosis device includes: a storage unit in which travel records of a moving body and past drive diagnosis results from past drive diagnoses executed for the moving body are stored; and a diagnosis processing unit that executes a drive diagnosis based upon driver's skills for driving the moving body, and personal characteristics of the driver and/or experience of the driver by using the travel records and the past drive diagnosis results stored in the storage unit.

7 Claims, 16 Drawing Sheets

| DRIVING OPERATION START DATE /TIME POINT | DRIVING OPERATION END DATE/TIME POINT | SCORE (SKILLS) | SCORE (TRANSMITTED) |
|---|---|---|---|
| 2015/4/1 15:00:15 | 2015/4/1 18:00:59 | 95 | 95 |
| 2015/4/2 16:22:21 | 2015/4/2 22:13:11 | 50 | 70 |
| 2015/5/1 9:00:12 | 2015/5/1 10:12:11 | 60 | 60 |
| 2015/6/1 9:00:12 | 2015/6/1 10:12:11 | 100 | 75 |

FIG.5

| SCORE | FREQUENCY OF SCORES 80 POINTS OR HIGHER | FREQUENCY OF SCORES 20 POINTS OR LOWER | FREQUENCY OF SCORES INTERMEDIATE SCORES |
|---|---|---|---|
| 50 | 0 | 0 | 1 |
| 80 | 1 | 0 | 1 |
| 90 | 2 | 0 | 1 |
| 30 | 2 | 1 | 1 |
| 20 | 2 | 2 | 1 |
| ... | ... | ... | ... |

FIG.6

| SCORE 601 | NUMBER OF SUCCESSIVE HIGH SCORES 602 | NUMBER OF SUCCESSIVE LOW SCORES 603 |
|---|---|---|
| 50 | 0 | 0 |
| 20 | 0 | 1 |
| 20 | 0 | 2 |
| 100 | 1 | 0 |
| 20 | 0 | 1 |

FIG.7

| # | SCORE | VARIANCE |
|---|---|---|
| 1 | 50 | 0 |
| 2 | 60 | 5 |
| ... | ... | ... |
| $n$ | $S_n$ | $V_n$ |

701 — # 
702 — SCORE 
703 — VARIANCE

FIG.10

| DRIVING OPERATION START TIME POINT 1001 | TIME ELAPSED SINCE PRECEDING DRIVING OPERATION 1002 | AVERAGE DIAGNOSIS INTERVAL 1003 | | |
|---|---|---|---|---|
| 2016/01/07 18:44:00 | — | — | | |
| 2016/01/08 18:50:00 | 1day 0:06:00 | 1day 0:06:00 | | |
| ⋮ | ⋮ | ⋮ | | |
| | | $\mu_D$ | | |

FIG.11

| DRIVING OPERATION START TIME POINT | IN-USE PERIOD | NUMBER OF TIMES DIAGNOSIS HAS BEEN USED |
|---|---|---|
| 2016/01/07 18:44:00 | — | 1 |
| 2016/01/08 18:50:00 | 1day 0:06:00 | 2 |
| 2016/01/09 18:50:00 | 2day 0:06:00 | 3 |
| $D_n$ | $Z_n$ | |

| TIME POINT | GYRO DATA | AZIMUTH DATA | ACCELERATION DATA |
|---|---|---|---|
| YYYY:MM:DD HH:MM:SS | | | |
| : | : | : | |

|  | SCORE |
|---|---|
| DRIVER RELIABILITY | 80 |

<DETAILS>

| | |
|---|---|
| DRIVE DIAGNOSIS USAGE STATUS | 50 |
| DRIVE DIAGNOSIS IN-USE PERIOD | 55 |
| DRIVE DIAGNOSIS USE INTERVAL | 50 |
| DRIVE DIAGNOSIS INTERVAL | 70 |
| OTHER INDEX | 90 |

DRIVE DIAGNOSIS DEVICE, DRIVE DIAGNOSIS SYSTEM AND TERMINAL DEVICE

INCORPORATION BY REFERENCE

The disclosure of the following priority application is herein incorporated by reference: Japanese Patent Application No. 2016-068612 filed Mar. 30, 2016

BACKGROUND OF THE INVENTION

1. Field of the Invention

The present invention relates to a drive diagnosis device, a drive diagnosis system and a terminal device.

2. Description of Related Art

In drive diagnosis in the related art, the driving skills of a driver, accident risk and the like are estimated and evaluated by measuring acceleration operations, braking operations, steering operations and the like performed by the driver via sensors installed in a vehicle. In addition, the results of such drive diagnosis are used in services that provide driving advice to drivers deemed to pose high accident risk and services that adjust the insurance premium for auto insurance in correspondence to the driving skill level of each driver. These services help the driver be aware of accident risk factors, thus lowering the risk of an accident and possibly reducing the insurance premium as the driver is encouraged to be a safer driver.

The known art related to drive diagnosis technologies includes the drive-evaluating device disclosed in Japanese Patent No. 5510471. This device creates a driving model to be used as an index for a specific driving operation, such as a deceleration operation, an acceleration operation, or a turning operation, based upon vehicle state quantities that include the extent or the time duration of a vehicle displacement and the extent of change in vehicle behavior, occurring between a driving operation start and a driving operation end, and evaluates the driving skills of the driver by using this driving model.

SUMMARY OF THE INVENTION

Crucial elements in drive diagnosis of a given driver include the personal characteristics and the driving experience of the driver, in addition to the driving skills of the driver. For instance, a driver capable of remaining focused over an extended period of time or an experienced driver is likely to be able to drive the vehicle more safely compared to drivers who are not able to remain focused or who are less experienced. The device disclosed in the publication cited above evaluates the driver only in an aspect of skills related to a specific driving operation performed by the driver without taking into consideration other elements such as individual personal characteristics and experience. The device thus leaves room for improvement in drive diagnosis accuracy.

A drive diagnosis device according to a first aspect of the present invention comprises: a storage unit in which travel records of a moving body and past drive diagnosis results from past drive diagnoses executed for the moving body are stored; and a diagnosis processing unit that executes a drive diagnosis based upon driver's skills for driving the moving body, and personal characteristics of the driver and/or experience of the driver by using the travel records and the past drive diagnosis results stored in the storage unit.

According to a second aspect of the present invention, in the drive diagnosis device according to the first aspect, it is preferable that the diagnosis processing unit determines the driver's skills based upon the travel records.

According to a third aspect of the present invention, in the drive diagnosis device according to the first aspect, it is preferable that the diagnosis processing unit determines the personal characteristics of the driver based upon records of past drive diagnosis results obtained based upon the driver's skills.

According to a fourth aspect of the present invention, in the drive diagnosis device according to the third aspect, it is preferable that the records of the past drive diagnosis results obtained based upon the driver's skills include at least one of; frequencies each indicating a number of times a score value representing drive diagnosis results was awarded over a predetermined past period, succession values each indicating a number of times a score value was successively awarded over the predetermined past period and a score variance indicating an extent of variance among score values representing the drive diagnosis results obtained over the predetermined past period.

According to a fifth aspect of the present invention, in the drive diagnosis device according to the first aspect, it is preferable that the drive diagnosis processing unit determines the personal characteristics of the driver based upon at least one of; records each indicating a number of times the moving body was driven during a traveling time block, records indicating durations of time over which the moving body was continuously driven, records indicating intervals between drive diagnoses and an age and a gender of the driver.

According to a sixth aspect of the present invention, in the drive diagnosis device according to the first aspect, it is preferable that the diagnosis processing unit determines the experience of the driver based upon at least one of a length of time over which the drive diagnosis has been in use and a number of times the drive diagnosis has been used.

A drive diagnosis system according to a seventh aspect of the present invention comprises: a terminal device that obtains information pertaining to travel of a moving body; and a center device engaged in communication with the terminal device via a communication line, wherein: the center device includes: a travel record reception unit that receives travel records pertaining to the moving body based upon the information from the terminal device; a storage unit in which the travel records of the moving body and past drive diagnosis results from past drive diagnoses executed for the moving body are stored; a diagnosis processing unit that executes a drive diagnosis based upon driver's skills for driving the moving body, personal characteristics of the driver and/or experience of the driver by using the travel records and the past drive diagnosis results stored in the storage unit; and a diagnosis result transmission unit that transmits results of the drive diagnosis to the terminal device; and the terminal device provides the results of the drive diagnosis transmitted from the center device.

A terminal device according to an eighth aspect of the present invention comprises: an information acquisition unit that obtains information pertaining to travel of a moving body; a storage unit in which travel records pertaining to the moving body based upon the information obtained by the information acquisition unit and past drive diagnosis results from past drive diagnoses executed for the moving body are stored; a diagnosis processing unit that executes a drive diagnosis based upon driver's skills for driving the moving body, personal characteristics of the driver and/or experience of the driver by using the travel records and the past drive diagnosis results stored in the storage unit; and a drive diagnosis result providing unit that provides results of the drive diagnosis.

In a terminal device according to a ninth aspect of the present invention that displays a diagnosis result screen showing results of a drive diagnosis executed for a moving body, the diagnosis result screen includes a score value determined based upon personal characteristics and/or experience of a driver of the moving body.

BRIEF DESCRIPTION OF THE DRAWINGS

FIG. 5 presents an example of information that may be generated in the embodiment of the present invention in the form of a chart of score frequencies each indicating the number of times a given score level was achieved.

FIG. 6 presents an example of information that may be generated in the embodiment of the present invention in the form of a chart of score succession values each indicating the number of times a given score level was achieved successively.

FIG. 7 is a chart presenting an example of score variance in the embodiment of the present invention.

FIG. 10 is a chart presenting an example of a diagnosis interval in the embodiment of the present invention.

FIG. 11 is a chart presenting examples of a diagnosis in-use periods in the embodiment of the present invention.

FIG. 12 is a chart presenting examples of travel records in the embodiment of the present invention.

FIG. 14 presents another example of a drive diagnosis screen that may be brought up on display at the terminal device.

DESCRIPTION OF EMBODIMENTS

The following is a description of the drive diagnosis device and the drive diagnosis system achieved in the embodiment of the present invention, given in reference to drawings.

Figure 1:
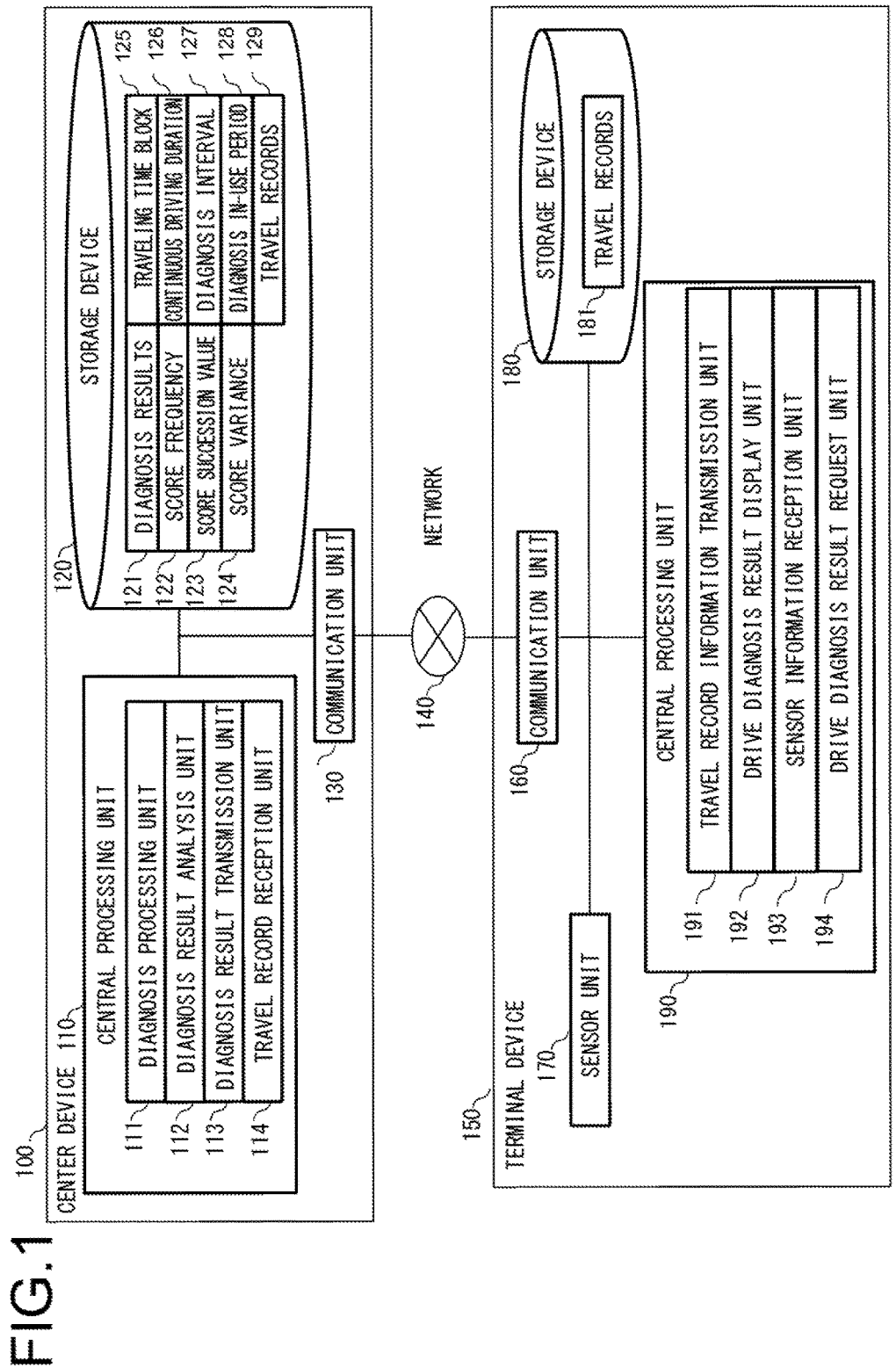
FIG. 1 is a diagram illustration the overall configuration of a drive diagnosis system achieved in an embodiment of the present invention.

FIG. 1 is a diagram illustration the overall configuration of the drive diagnosis system achieved in the embodiment of the present invention. The drive diagnosis system achieved in the embodiment is a computer system configured with a center device 100 and a terminal device 150 installed in a vehicle, i.e., a moving body, connected with each other via a network 140, as shown in FIG. 1.

In the drive diagnosis system in FIG. 1, the center device 100 executes a drive diagnosis and provides the results of the diagnosis to the driver of the moving body by transmitting the diagnosis results to the terminal device 150. The center device 100 executes the drive diagnosis based upon the personal characteristics and the experience of the driver as well as the driving skills of the driver. For instance, if the driver has continuously demonstrated high skill levels, the center device 100 judges that the driver, having driven the vehicle with a high level of concentration, is likely to pose a low risk of accident in subsequent driving operations, and awards a high score as a diagnosis result. It is to be noted that a specific method of drive diagnosis will be described in detail later.

The center device 100 is a device that functions as a drive diagnosis device engaged in drive diagnosis in the system. The center device 100, which may be constituted with a standard computer, includes a central processing unit 110, a storage device 120 and a communication unit 130.

The storage device 120 where various types of information required by the center device 100 when executing a drive diagnosis are stored, may be constituted with a hard disk, a flash memory or the like. The information stored in the storage device 120 includes diagnosis results 121, score frequency 122, score succession value 123, score variance 124, traveling time block 125, continuous driving duration 126, diagnosis intervals 127, diagnosis in-use period 128 and travel records 129.

Figure 4:
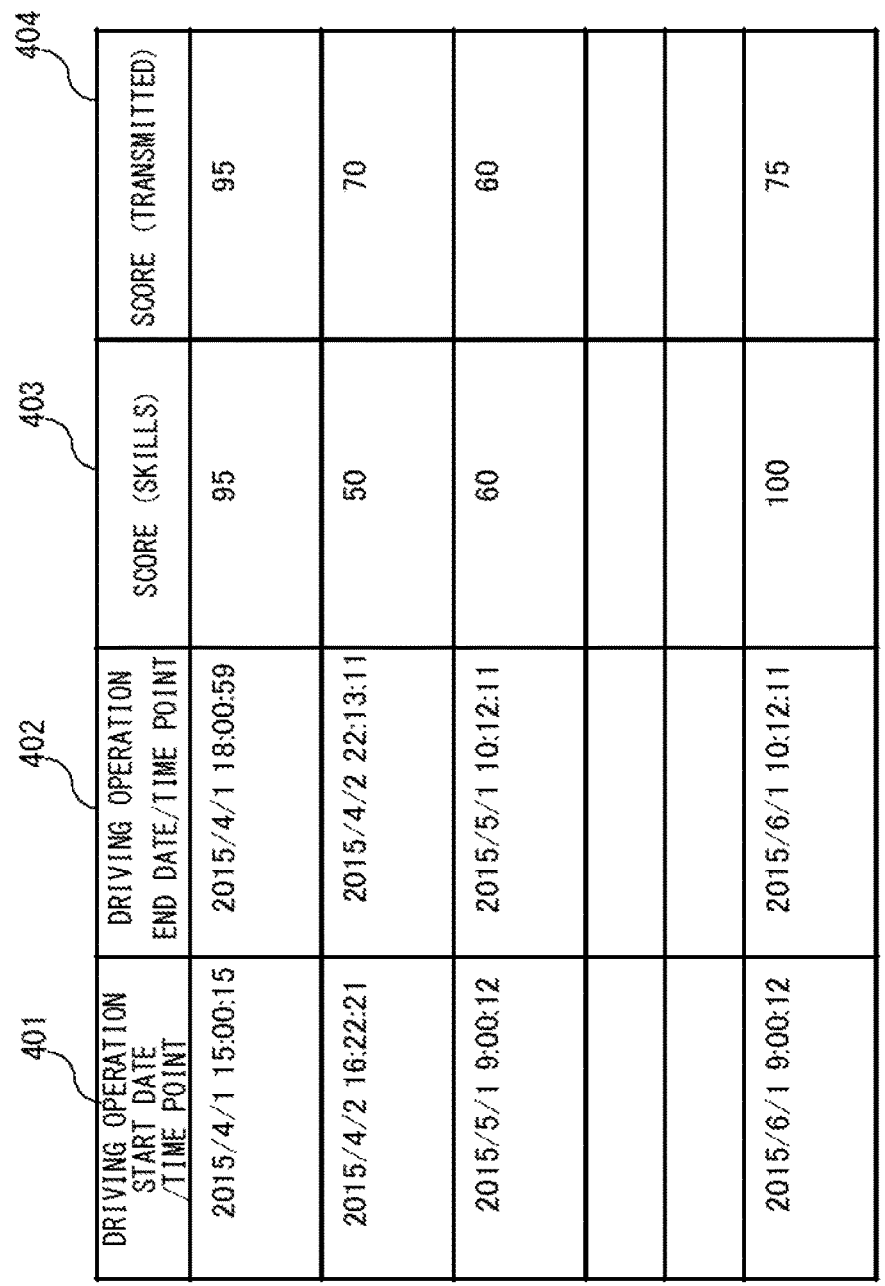
FIG. 4 is a chart of diagnosis results that may be obtained through the embodiment of the present invention.

The diagnosis results 121 are information indicating past drive diagnosis results accumulated for the vehicle, i.e., the results of drive diagnoses having been executed for the vehicle in the past by the center device 100. FIG. 4 is a chart presenting examples of diagnosis results 121 that may be obtained in the embodiment of the present invention. In the storage device 120, where sets of information such as those shown in FIG. 4 are stored as the diagnosis results 121 in time series in correspondence to individual vehicle driving operations, the information is managed in correspondence to each driver. In each field in column 401 in FIG. 4, the date/time point at which the driver started driving the vehicle for a given driving operation is stored. In the corresponding field in column 402, the date/time point at which the driver finished driving the vehicle for the subject driving operation is stored. In the corresponding field in column 403, a score value representing the drive diagnosis results for the subject driving operation, calculated based upon the driver's skills is stored. In the corresponding field in column 404, a score value representing the drive diagnosis results for the subject driving operation, calculated by factoring in the personal characteristics and the experience of the driver, in addition to the driver's skills, is stored.

The score frequency 122 is information indicating the number of times each score value was awarded as drive diagnosis results over a predetermined length of past period. FIG. 5 is a chart presenting an example of information that may be accumulated as the score frequency 122 in the embodiment of the present invention. In the storage device 120, where sets of information such as those shown in FIG. 5 are stored as the score frequency 122 in time series in correspondence to individual vehicle driving operations, the information is managed in correspondence to each driver. In each field in column 501 in FIG. 5, points (score) representing drive diagnosis results determined based upon driving skills demonstrated in a given driving operation are stored. In the corresponding field in column 502, a cumulative value representing the number of times high scores were awarded prior to the subject driving operation, e.g., the number of scores of 80 or higher were entered in column 501, is stored. In the corresponding field in column 503, a cumulative value representing the number of times low scores were awarded prior the subject driving operation, e.g., the number of times scores of 20 or lower were entered in column 501, is stored. In the corresponding field in column 504, a cumulative value representing the number of times intermediate scores were awarded prior to the subject driving operation, e.g., the number of times scores between 20 and 80 were entered in column 501, is stored. It is to be noted that the storage device 120 holds sets of information for the score frequency 122, such as those shown in FIG. 5, accumulated over a predetermined length of past period, e.g., over the past one-month period or the past one-year period. Once a set of information ages out beyond this prescribed period, it is deleted from the storage device 120.

The score succession value 123 is information providing values each indicating the number of times a given score value was awarded as drive diagnosis results successively over a predetermined length of past period. FIG. 6 is a chart presenting an example of information that may be accumulated as the score succession value 123 in the embodiment of the present invention. In the storage device 120, where sets of information such as those in FIG. 6 are stored as the score succession value 123 in time series in correspondence to individual vehicle driving operations, the information is managed in correspondence to each driver. In each field in column 601 in FIG. 6, points (score) representing the drive diagnosis results, determined based upon driver's skills demonstrated in a given driving operation, are stored. In the corresponding field in column 602, a value representing the number of times high scores were awarded successively prior to the subject driving operation, e.g., the number of times scores of 80 points or higher were entered successively in column 601, is stored. In the corresponding field in column 603, a value representing the number of times low scores were awarded successively prior to the corresponding driving operation, e.g., the number of scores of 20 or lower were entered successively in column 601, is stored. It is to be noted that the storage device 120 holds sets of information for the score succession value 123, such as those shown in FIG. 6, accumulated over a predetermined length of past period, e.g., over the past one-month period or the past one-year period. Once a set of information ages out beyond this prescribed period, it is deleted from the storage device 120.

The score variance 124 is information indicating variance among scores calculated as drive diagnosis results over a predetermined length of past period. FIG. 7 is a chart presenting an example of information that may be stored as the score variance 124 in the embodiment of the present invention. In the storage device 120, where sets of information such as those in FIG. 7 are stored as the score variance 124 in time series in correspondence to the individual vehicle driving operations, the information is managed in correspondence to each driver. In fields in column 701 in FIG. 7, sequential numbers each indicating the time order of a given driving operation, are stored. In the corresponding field in column 702, points (score) representing the drive diagnosis results, determined based upon the driver's skills demonstrated during the particular driving operation, is stored. In the corresponding field in column 703, a value representing variance of points having been awarded prior to the particular driving operation, e.g., a value representing dispersion of values stored in fields in column 702 starting with the top field through the field corresponding to the particular driving operation, is stored. It is to be noted that the storage device 120 holds sets of information for the score variance 124, such as those shown in FIG. 7, accumulated over a predetermined length of past period, e.g., over the past one-month period or the past one-year period. Once a set of information ages out beyond this prescribed period, it is deleted from the storage device 120.

Figure 8:
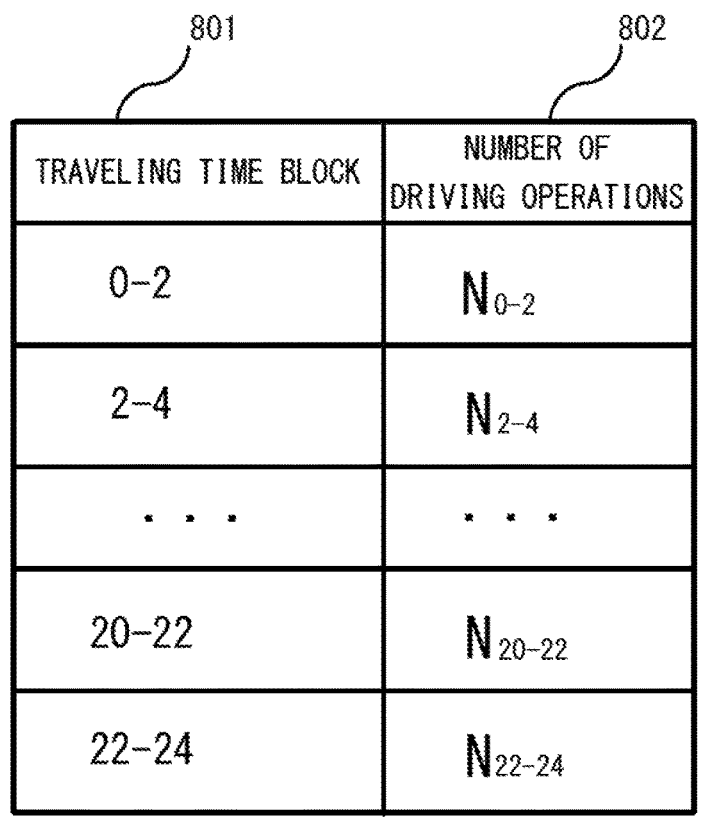
FIG. 8 is a chart presenting examples of traveling time blocks in the embodiment of the present invention.

The traveling time block 125 is information providing travel records of the vehicle in correspondence to various traveling time blocks. FIG. 8 is a chart presenting an example of information that may be stored as the traveling time block 125 in the embodiment of the present invention. In the storage device 120, information such as that shown in FIG. 8 is managed as the traveling time block 125 in correspondence to each driver. In each field in column 801 in FIG. 8, a specific traveling time block designation (category) is stored. In each field in column 802, a cumulative value representing the number of times the vehicle was engaged in traveling operation during the particular traveling time block designation entered in the corresponding field in column 801, is stored.

Figure 9:
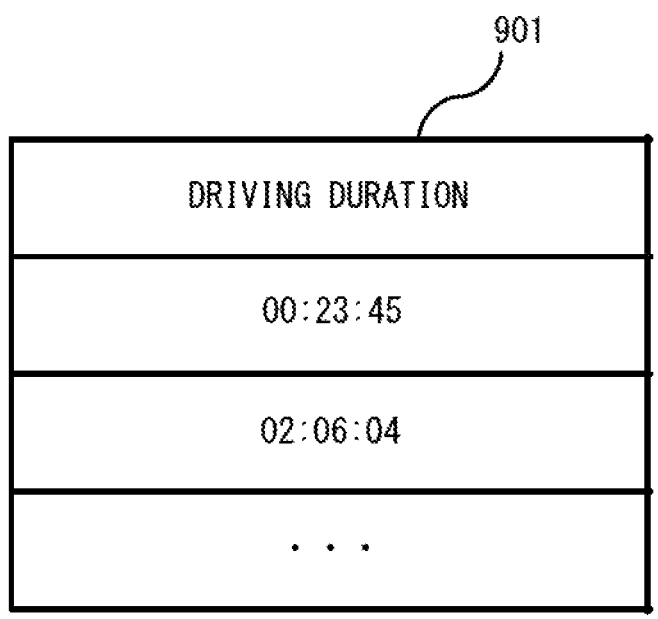
FIG. 9 is a chart presenting examples of continuous driving time durations in the embodiment of the present invention.

The continuous driving duration 126 is information providing records of durations of time over which the vehicle was continuously driven. FIG. 9 is a chart presenting an example of information that may be stored as the continuous driving duration 126 in the embodiment of the present invention. In the storage device 120 where sets of information such as those shown in FIG. 9 are stored as the continuous driving duration 126 in time series in correspondence to individual driving operations, the information is in correspondence to each driver. In each field in column 901 in FIG. 9, the duration of time over which the driver continuously drove the vehicle during a given driving operation is stored. It is to be noted that if a driving operation is interrupted for a driver rest or the like, a plurality of continuous driving durations may be stored for the single driving operation.

The diagnosis interval 127 is information providing records of drive diagnosis intervals. FIG. 10 is a chart presenting an example of information that may be stored as the diagnosis interval 127 in the embodiment of the present invention. In the storage device 120, sets of information such as those shown in FIG. 10 are stored as the diagnosis interval 127 in time series in correspondence to individual driving operations, the information is managed in correspondence to each driver. In each field in column 1001 in FIG. 10, the time point at which the driver started driving the vehicle for a given driving operation is stored. In the corresponding field in column 1002, the number of days and the number of hours having elapsed following the driving start time point for the previous driving operation through the driving start time point for the driving operation, are stored as information indicating the length of time having elapsed since the previous driving operation. In the corresponding field in column 1003, an average diagnosis interval for the driving operation, calculated as the average of values entered in the fields in column 1002 leading up to the subject driving operation, is stored.

The diagnosis in-use period 128 is information indicating the period of time the drive diagnosis has been in use and the number of times the drive diagnosis has been used. FIG. 11 is a chart presenting an example of information that may be stored as the diagnosis in-use period 128 in the embodiment of the present invention. In storage device 1201, where sets of information such as those in FIG. 11 are stored as the diagnosis in-use period 128 in time series in correspondence to individual driving operations, the information is managed in correspondence to each driver. In each field in column 1101 in FIG. 11, the time point at which the driver started driving the vehicle for a given driving operation is stored. In the corresponding field in column 1102, the number of days and the number of hours having elapsed following the driving start time point for the very first driving operation through the driving start time point for the particular driving operation, are stored as information indicating the length of time over which the drive diagnosis has been in use leading up to the particular driving operation. In the corresponding field in column 1103, the number of times the vehicle was driven, starting with the first driving operation and including the particular driving operation, is stored as information indicating the number of times the drive diagnosis has been used.

Figure 12:
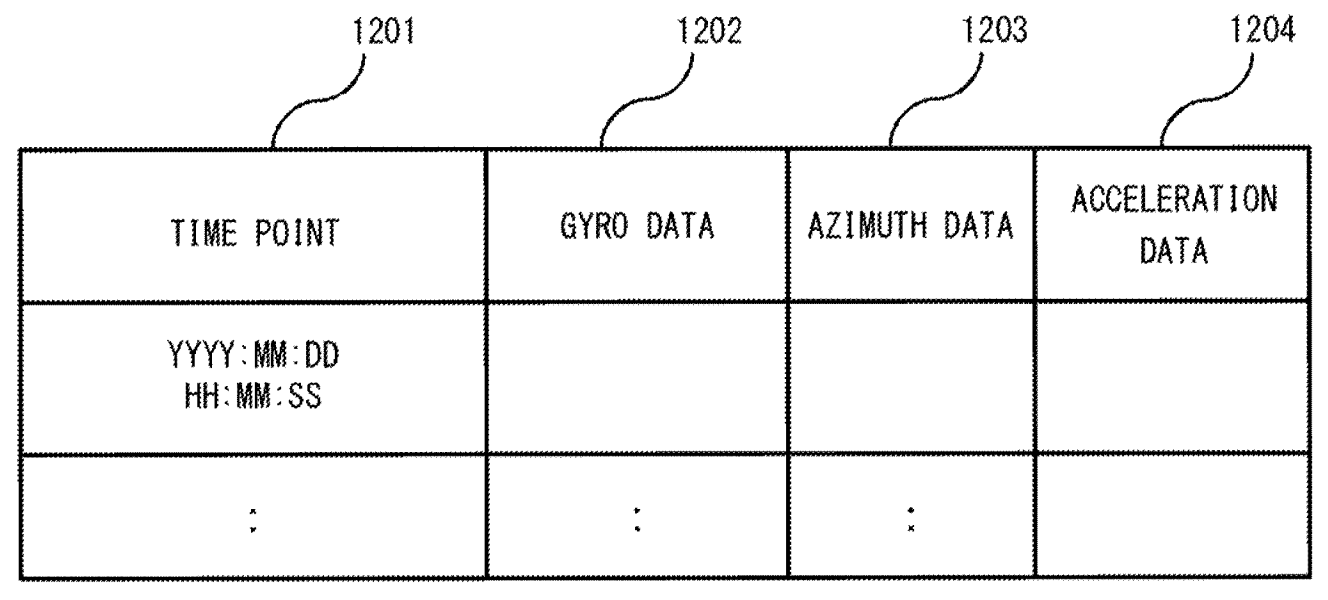

The travel records 129 are information providing travel records pertaining to the vehicle. FIG. 12 is a chart presenting an example of information that may be stored as the travel records 129 in the embodiment of the present invention. In the storage device 120 sets of information such as those in FIG. 12 are stored as the travel records 129 in time series in correspondence to individual vehicle driving operations, the information is managed in correspondence to each driver. In each field in column 1201 in FIG. 12, a time point at which a given set of vehicle travel records was obtained is stored. In fields in columns 1202, 1203 and 1204 gyro data, azimuth data and acceleration data are respectively stored as information providing vehicle travel records.

The central processing unit 110 includes a diagnosis processing unit 111, a diagnosis result analysis unit 112, a diagnosis result transmission unit 113 and a travel record reception unit 114 fulfilling various functions required in the system. The central processing unit 110 is able to fulfill these functions by executing specific programs.

The diagnosis processing unit 111 executes a drive diagnosis for the vehicle based upon the various types of information assigned with reference numerals 122 through 129, such as those shown in FIGS. 5 through 12, included in the information stored in the storage device 120 as described earlier. The diagnosis results obtained through the drive diagnosis are then stored into the storage device 120 as the diagnosis results 121.

The diagnosis result analysis unit 112 calculates score frequencies each indicating the number of times a specific score was awarded, score succession values and score variance for the drive diagnosis results having been obtained over a predetermined time period starting with a past time point and leading up to the current time point based upon the diagnosis results 121 stored in the storage device 120. The values thus calculated are then individually stored into the storage device 120 as latest values for the score frequency 122, the score succession value 123 and the score variance 124. In addition, it determines the traveling time block during which the vehicle was most recently engaged in a driving operation, the drive diagnosis in-use period having elapsed leading up to the most recent driving operation, the drive diagnosis interval preceding the most recent driving operation, the duration of time through which the driver continuously drove the vehicle in the most recent driving operation and the like, through calculation executed based upon the travel records 129 stored in the storage device 120. The values thus calculated are then individually stored into the storage device 120 as the latest values for the traveling time block 125, the diagnosis in-use period 128, the diagnosis interval 127 and the continuous driving duration 126.

In response to a request for drive diagnosis results issued from the terminal device 150, the diagnosis result transmission unit 113 reads out the diagnosis results 121 stored in the storage device 120 and transmits the diagnosis results 121 to the terminal device 150 as drive diagnosis results for the vehicle via the communication unit 130 and the network 140.

The travel record reception unit 114 receives, via the communication unit 130, vehicle travel records transmitted from the terminal device 150 via the network 140 and stores them as the travel records 129 into the storage device 120.

The terminal device 150 is an on-vehicle device that provides vehicle travel records to the center device 100 and receives drive diagnosis results provided by the center device 100 in the system. The terminal device 150, which may be constituted with a standard computer, includes a communication unit 160, a sensor unit 170, a storage device 180 and a central processing unit 190.

The sensor unit 170 obtains various types of sensor information related to vehicle travel and outputs the sensor information to the central processing unit 190. The sensor unit 170, which may include a gyro sensor, an azimuth sensor, an acceleration sensor and the like, outputs various types of sensor information such as gyro data, azimuth data and acceleration data generated based upon the detection values provided from the sensors to the central processing unit 190.

The storage device 180, where various types of information necessary to enable the terminal device 150 to receive the drive diagnosis results provided by the center device 100, may be constituted with a hard disk, a flash memory or the like. The information stored in the storage device 180 includes travel records 181.

The travel records 181 are information providing travel records pertaining to the vehicle. In the storage device 180, travel record information pertaining to the vehicle, generated based upon the various types of sensor information obtained via the sensor unit 170, is stored in time series as the travel records 181 in a format similar to that of the travel records 129 described in reference to FIG. 12.

The central processing unit 190 includes a travel record information transmission unit 191, a drive diagnosis result display unit 192, a sensor information reception unit 193 and a drive diagnosis result request unit 194 fulfilling various functions required in the system. The central processing unit 190 is able to fulfill these functions by executing specific programs.

The travel record information transmission unit 191 reads out the travel records 181 stored in the storage unit 180 and transmits the travel records to the center device 100 as travel records pertaining to the vehicle via the communication unit 160 and the network 140. It is to be noted that the travel record information transmission unit 191 may transmit vehicle travel records over predetermined cycles, e.g., every one second, or each time a vehicle driving operation is completed.

The drive diagnosis result display unit 192 brings up vehicle drive diagnosis result transmitted from the center device 100 via the network 140 and received at the communication unit 160 on display at a display unit or the like (not shown). The results of a drive diagnosis executed at the center device 100 are provided to the driver in this manner. It is to be noted that the vehicle drive diagnosis results may be provided to the driver through a different method, e.g., through an audio output, instead of displaying them at a display unit.

The sensor information reception unit 193 receives sensor information output from the sensor unit 170 and stores vehicle travel records generated based upon the sensor information as the travel records 181 into the storage device 180. The travel records 181 stored into the storage device 180 at this time, which assume a format similar to that of the travel records 129 described in reference to FIG. 12, include information indicating the date/time point at which the particular travel records were obtained.

In response to a driver operation or the like, the drive diagnosis result request unit 194 issues a request for vehicle drive diagnosis results to the center device 100. The drive diagnosis result request unit 194 is able to issue a drive diagnosis result request to the center device 100 by, for instance, transmitting a specific diagnosis request signal to the center device 100 via the communication unit 150 and the network 140.

Figure 2:
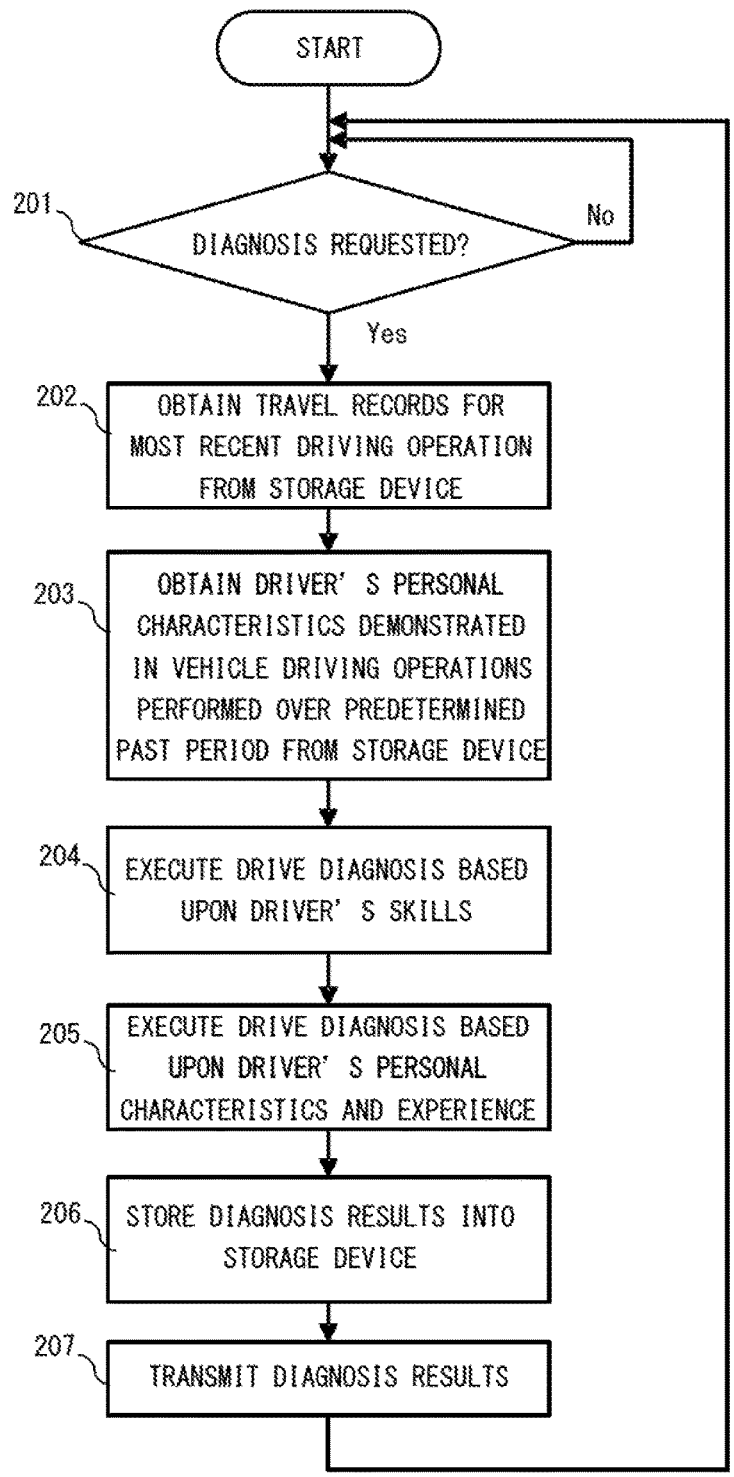
FIG. 2 presents a flowchart of the drive diagnosis processing executed in the embodiment of the present invention.

Processing executed in the center device 100 in the drive diagnosis system shown in FIG. 1 will be explained next. FIG. 2 is a flowchart of the drive diagnosis processing executed in the embodiment of the present invention. This processing flow is executed by the central processing unit 110 in the center device 100.

The central processing unit 110 first makes a decision in step 201 as to whether a diagnosis request was issued from the terminal device 150. In this processing step, a decision as to whether a request for drive diagnosis results was issued to the center device 100 from the drive diagnosis result request unit 194 in the terminal device 150 is made through the method explained earlier. If a diagnosis request signal transmitted from the drive diagnosis result request unit 194 in the terminal device 150 was received, the processing proceeds to the next step 202, whereas if no such signal was received, the processing in step 201 is repeatedly executed after a predetermined standby period.

Next, the central processing unit 110 engages the diagnosis processing unit 111 in step 202 to obtain travel record information pertaining to the most recent driving operation included in the travel records 129 by reading it out from the storage device 120.

The central processing unit 110 then engages the diagnosis processing unit 111 in step 203 to obtain information indicating driver characteristics having been demonstrated in vehicle driving operations performed over a predetermined past period by reading it out from the storage device 120. In this example, the score frequency 122, the score succession value 123, the score variance 124, the traveling time block 125, the continuous driving duration 126, the diagnosis interval 127 and the diagnosis in-use period 128 are read out from the storage device 120 as information indicating the driver characteristics demonstrated through the vehicle driving operations performed over the predetermined past period. It is to be noted that the various types of information listed above are generated through the processing flow in FIG. 3, as will be explained later. Methods for generating such information will be described in specific detail later.

Next, the central processing unit 110 engages the diagnosis processing unit 111 in step 204 to execute a drive diagnosis based upon the driver's skills. In this step, the driver's skills are determined based upon the most recent travel records obtained through step 202 and a score value (points) representing the drive diagnosis results is calculated based upon the driver's skills thus determined. For instance, acceleration/deceleration states and turning states pertaining to the vehicle may be calculated based upon the travel records 129 and the driver's skills can be determined by making decisions as to whether abrupt acceleration/deceleration operations and abrupt turning operations were performed based upon the calculation results to obtain a score value corresponding to the driver's skills.

The central processing unit 110 then engages the diagnosis processing unit 111 in step 205 to execute a drive diagnosis based upon the personal characteristics and the experience of driver. In this step, the personal characteristics and the experience of the driver are determined based upon various types of information, such as the score frequency 122, the score succession value 123, the score variance 124, the traveling time block 125, the continuous driving duration 126, the diagnosis interval 127 and the diagnosis in-use period 128 obtained in step 203, and a score value (points) representing the drive diagnosis results are calculated in correspondence to the driver's personal characteristics and experience thus determined. A specific example of a score value calculation method that may be adopted when calculating a score value by using the information listed above will be explained next.

The score frequency 122, the score succession value 123 and the score variance 124 provide records of past drive diagnosis results determined based upon the driver's skills. Through the processing executed in step 205, a driver's personal characteristics are determined by using this information, i.e., based upon the record of past drive diagnosis results obtained based upon the driver's skills, to calculate a score value corresponding to the driver's personal characteristics thus determined.

For instance, cumulative values each representing the number of times a specific score value was awarded in past drive diagnosis results can be determined based upon the values stored in fields in the row corresponding to the most recent driving operation, among the values stored in the various fields in the columns 502 through 504 for the score frequency 122 in FIG. 5. If the cumulative value for high scores achieves a higher ratio, the subject driver can be considered to demonstrate a tendency for safe driving and thus pose a low risk of accident. Accordingly, a high value is awarded as the score representing the drive diagnosis results obtained based upon the personal characteristics of the driver. If, on the other hand, the cumulative value for low scores achieves a higher ratio, the driver is considered to demonstrate a tendency for unsafe driving and thus pose a high risk of accident. Accordingly, a low value is awarded as the score representing the drive diagnosis results obtained based upon the personal characteristics of the driver.

In addition, the largest values among or the average values of succession values indicated in the past drive diagnosis results may be individually determined in correspondence to high scores and low scores based upon the values stored in the fields in the columns 602 and 603 for the score succession value 123 in FIG. 6. If the largest value or the average value corresponding to the high score succession values is relatively large, the driver is considered to be a careful driver by nature and thus pose a low risk of accident. Accordingly, a high value is awarded as the score representing the drive diagnosis results obtained based upon the personal characteristics of the driver. In contrast, if the largest value or the average value corresponding to low score succession values is relatively small, the driver is considered to be less careful and thus pose a high risk of accident. Accordingly, a low value is awarded as the score representing the drive diagnosis results obtained based upon the personal characteristics of the driver.

In addition, the extent of variance among scores indicated in the past drive diagnosis results is determined based upon the values stored in the fields in the row corresponding to the most recent driving operation, among the values stored in the various fields in columns 702 and 703 for the score variance 124 in FIG. 7. If the score variance is small, the driver is considered to demonstrate a tendency for stable driving and thus pose a low risk of accident. Accordingly, a high value is awarded as the score representing the drive diagnosis results obtained based upon the personal characteristics of the driver. In contrast, if the score variance is large, the driver is considered to demonstrate a tendency for unstable driving and thus pose a high risk of accident. Accordingly, a low value is awarded as the score representing the drive diagnosis results obtained based upon the personal characteristics of the driver.

It is to be noted that it is not strictly necessary to use all the information listed above, i.e., the score frequency 122, the score succession value 123 and the score variance 124, when calculating a score as explained above. In the processing executed in step 205, the personal characteristics of the driver can be determined based upon the records of past drive diagnosis results obtained based upon the driver's skills and a score corresponding to the driver's personal characteristics thus determined can be calculated by using at least one of the score frequency 122, the score succession value 123 and the score variance 124.

The traveling time block 125 is information providing records pertaining to vehicle traveling time blocks. In the processing executed in step 205, personal characteristics unique to the driver can be determined based upon the traveling time block 125 to calculate a score value corresponding to the driver's personal characteristics thus determined.

For instance, the ratio of the number of times the vehicle was driven during each time block can be determined based upon values stored in the individual fields in column 802 for the traveling time block 125 in FIG. 8. Then, if the ratio of the number of times the vehicle was driven during a time block with a low accident occurrence rate is high, the subject driver can be considered to have a tendency of avoiding time blocks with a high accident rate and thus pose a low risk of accident. Accordingly, a high value is awarded as the score representing the drive diagnosis results obtained based upon the personal characteristics of the driver. In contrast, if the ratio of the number of times the vehicle was driven during a time block with a high accident occurrence rate is high, the driver is considered to typically choose to drive the vehicle at any time without taking into consideration the accident occurrence rate and thus, pose a high risk of accident. Accordingly, a low value is awarded as the score representing the drive diagnosis results obtained based upon the personal characteristics of the driver.

The continuous driving duration 126 is information providing records pertaining to the lengths of time the vehicle was driven continuously. Through the processing executed in step 205, personal characteristics unique to the driver can be determined based upon the continuous driving duration 126 to calculate a score value corresponding to the driver's personal characteristics thus determined.

For instance, the largest value among, or the average value of the continuous driving time durations over which the vehicle was driven may be determined based upon the values stored in the fields in column 901 for the continuous driving duration 126 in FIG. 9. If the value thus determined is small, the driver is considered to typically avoid driving the vehicle over extended periods of time and thus pose a low risk of accident. Accordingly, a high value is awarded as the score representing the drive diagnosis results obtained based upon the personal characteristics of the driver. In contrast, if the value is large, the driver is considered to typically drive the vehicle over extended periods of time and thus pose a high risk of accident. Accordingly, a low value is awarded as the score representing the drive diagnosis results obtained based upon the personal characteristics of the driver.

The diagnosis interval 127 is information providing drive diagnosis interval records. Through the processing executed in step 205, personal characteristics unique to the driver can be determined based upon the diagnosis interval 127 to calculate a score value corresponding to the driver's personal characteristics thus determined.

For instance, the variance among or the average value of diagnosis intervals can be determined based upon the values stored in the fields in the row corresponding to the most recent driving operation, among the values stored in the fields in column 1002 and column 1003 for the diagnosis interval 127 in FIG. 10. If the value thus determined is small, the driver is assumed to have high user awareness for drive diagnosis with a clear purpose for using drive diagnosis and tends to drive on roads he is familiar with. The driver is thus considered to pose a low risk of accident. Accordingly, a high value is awarded as the score representing the drive diagnosis results obtained based upon the personal characteristics of the driver. In contrast, if the value is large, the driver is assumed to have low user awareness for drive diagnosis without a clear purpose for using drive diagnosis and tends to drive on unfamiliar roads and is thus considered to pose a high risk of accident. Accordingly, a low value is awarded as the score representing the drive diagnosis results obtained based upon the personal characteristics of the driver.

The diagnosis in-use period 128 is information indicating the length of time over which the drive diagnosis has been in use and the number of times the drive diagnosis has been used. Through the processing executed in step 205, the driver's experience can be determined based upon the diagnosis in-use period 128 to calculate a score value corresponding to the driver's experience thus determined is calculated.

For instance, the length of time over which drive diagnosis has been in use and the number of times drive diagnosis has been used can be determined based upon the values stored in the fields in the row corresponding to the most recent driving operation among the values stored in the fields in the columns 1102 and 1103 for the diagnosis in-use period 128 in FIG. 11. If these values are large, the driver is considered to have ample experience using drive diagnosis and thus assure a high level of reliability of his diagnosis results. Accordingly, a high value is awarded as the score representing the drive diagnosis results obtained based upon the experience of the driver. In contrast, if these values are small, the driver can be considered to lack experience in using drive diagnosis and thus not assure high reliability of his diagnosis results. Accordingly, a low value is awarded as the score representing the drive diagnosis results obtained based upon the personal characteristics of the driver.

The methods described above can be adopted when executing the processing in step 205, to execute a drive diagnosis based upon the driver's personal characteristics and experience by using the various types of information such as the score frequency 122, the score succession value 123, the score variance 124, the traveling time block 125, the continuous driving duration 126, the diagnosis interval 127 and the diagnosis in-use period 128. However, it is not strictly necessary to use all the information listed above. In the processing executed in step 205, a score value indicating drive diagnosis results obtained by determining the driver's personal characteristics and experience based upon at least one type of information among those listed above can be calculated. In addition, the driver's personal characteristics and experience can be determined by taking into consideration the age, the gender and the like of the driver and a score value indicating the drive diagnosis results may be obtained based upon the driver's personal characteristics and experience thus determined.

Next, the central processing unit 110 stores the diagnosis results 121 into the storage device 120 in step 206, based upon the score value representing the drive diagnosis results obtained through calculation based upon the driver's skills in step 204 and the score value representing the drive diagnosis results obtained through calculation based upon the driver's personal characteristics and/or experience in step 205. In this step, a final score value incorporating the driver's skills, personal characteristics, experience and the like is calculated by combining the score value representing the drive diagnosis results obtained through calculation based upon the driver's skills in step 204 with the score value representing the drive diagnosis results obtained through calculation based upon the driver's personal characteristics and/or experience in step 205. For instance, the final score value may be calculated as the sum of values obtained by multiplying these score values by predetermined weighting coefficients. It then stores the driving operation start date/time point and the driving operation end date/time point for the subject driving operation, the score value representing the drive diagnosis results obtained through calculation based upon the driver's skills in step 204 and the final score value calculated as described above into the fields in the row corresponding to the subject driving operation, among the fields in the columns 401 through 404 in FIG. 4.

Finally, the central processing unit 110 transmits, via the diagnosis result transmission unit 113, the diagnosis results 121 having been stored into the storage device 120 in step 206 to the terminal device 150 in step 207.

The center device 100 is able to execute a drive diagnosis by taking into consideration the driver's personal characteristics and experience as well as the driver's skills through the processing procedure described above. As a result, the accuracy of drive diagnosis can be improved.

Figure 3:
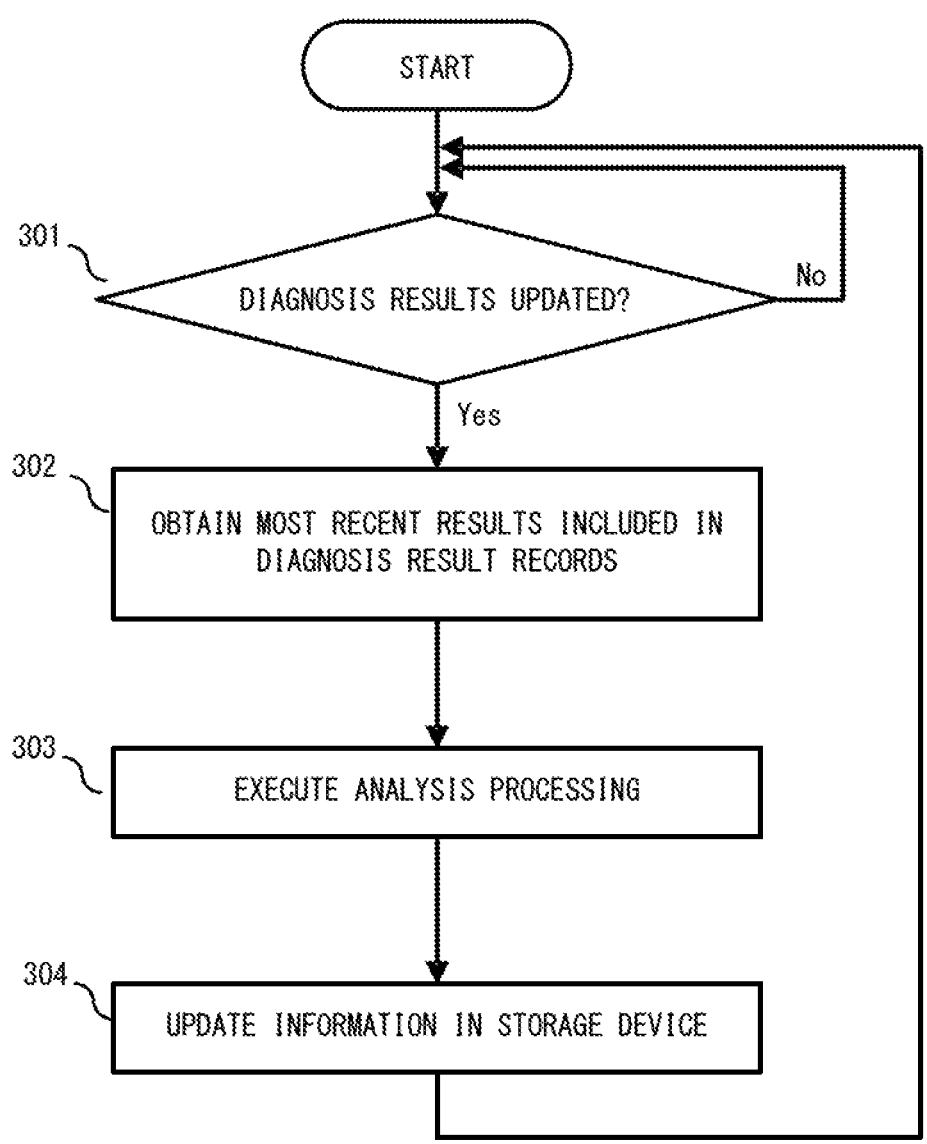
FIG. 3 presents a flowchart of the information creation processing executed in the embodiment of the present invention.

FIG. 3 presents a flowchart of processing executed for information creation in the embodiment of the present invention. The processing in this flowchart is executed by the central processing unit 110 in the center device 100 in order to create the various types of information, i.e., the score frequency 122, the score succession value 123, the score variance 124, the traveling time block 125, the continuous driving duration 126, the diagnosis interval 127 and the diagnosis in-use period 128.

The central processing unit 110 first makes a decision in step 301 as to whether the diagnosis results 121 have been updated. If the processing flow explained in reference to FIG. 2 was executed and thus the diagnosis results 121 have been updated, the processing proceeds to the following step 302, whereas if no update was made, the processing in step 301 is repeatedly executed after a predetermined standby period.

Next, the central processing unit 110 engages the diagnosis result analysis unit 112 in step 302, to obtain drive diagnosis results obtained based upon the driver's skills and stored as the diagnosis results 121, by reading them out from the storage device 120. In this step, the values stored in the fields in columns 401 through 403 in FIG. 4 are read out to obtain the driving operation start date/time points and the driving operation end date/time points of all driving operations and the score values representing the drive diagnosis results calculated based upon the driver's skills demonstrated in the various driving operations.

Next, the central processing unit 110 engages the diagnosis result analysis unit 112 in step 303 to execute analysis processing based upon the drive analysis results obtained in step 302. In this step, based upon the score values read out in step 302, values to be stored for the score frequency 122, the score succession value 123, the score variance 124, the traveling time block 125, the continuous driving duration 126, the diagnosis interval 127 and the diagnosis in-use period 128 are calculated. The following is a description given in specific terms on how values for the various types of information may be calculated.

The values for the score frequency 122 can be determined based upon the score value calculated for the most recent driving operation included in the sets of drive diagnosis results read out in step 302. More specifically, a decision is made to designate the value stored in the field corresponding to the most recent driving operation in column 403 in FIG. 4 as one of the score classes, i.e., the high score, the low score and the intermediate score described in reference to FIG. 5, and the values for the score frequency 122 are determined by adding 1 to the cumulative value for the designated score class. For instance, if the value stored for the most recent driving operation is at least 80 points, the cumulative value for the high score will be incremented by 1, if the value is 20 points or lower, the cumulative value for the low score will be incremented by 1 and if the value is greater than 20 points and less than 80 points, cumulative value for the intermediate score will be incremented by 1.

The value for the score succession value 123 can be determined based upon the score value calculated for the most recent driving operation included in the sets of drive diagnosis results read out in step 302. In more specific terms, a decision is made as to whether the value stored in the field corresponding to the most recent driving operation in column 403 in FIG. 4 can be designated to either the high score class or the low score class described in reference to FIG. 6. If the value stored for the most recent driving operation is designated to the score class matching that for the preceding driving operation, the succession value for the score class is incremented by 1, whereas if it is designated to a score class different from that of the preceding driving operation, the succession value for the most recent score class is set to 1, with the succession value for the other score class reset to 0. The values to be set for the score succession value 123 are thus determined. It is to be noted that if the value stored for the most recent driving operation cannot be designated to either the high score class or the low score class, the succession values for the two score classes may remain unchanged from the values set for the preceding driving operation or the succession values for the two score classes may both be reset to 0.

The value to be set for the score variance 124 is determined based upon the score values determined for the individual driving operations having been performed over a predetermined past period, included in the sets of drive diagnosis results read out in step 302. More specifically, the value for the score variance 124 is determined by extracting the values stored over a predetermined past period, e.g., over the past one-month period or the past one-year period, in the fields in column 403 in FIG. 4 and calculating dispersion or the like among these values.

The values to be set for the traveling time block 125 are determined based upon the driving operation start date/time point and the driving operation end date/time point of the most recent driving operation, included in the sets of drive diagnosis results read out in step 302. In more specific terms, a decision is made based upon the values stored in the fields in the columns 401 and 402 in FIG. 4 in correspondence to the most recent driving operation to determine into which of the traveling time blocks in FIG. 8 the traveling period of the most recent driving operation falls, and the values for the traveling time block 125 are set with the number of trips for the traveling time block incremented by 1.

The value to be set for the continuous driving duration 126 is determined based upon the driving operation start date/time point and the driving operation end date/time point of the most recent driving operation, included in the sets of drive diagnosis results read out in step 302. More specifically, the value for the continuous driving duration 126 is calculated by determining the length of time that elapsed between the driving operation start and the driving operation end in the most recent driving operation based upon the values stored in the fields in columns 401 and 402 corresponding to the most recent driving operation in FIG. 4. It is to be noted that a decision may be made as needed based upon the travel records 129 as to whether the driver of the vehicle took a break during the driving operation and the time duration that elapsed between the driving operation start and the driving operation end may be divided into a plurality of continuous driving durations depending upon the decision-making results. Under such circumstances, a plurality of values will be stored into the continuous driving duration 126 in step 304 which will be described later.

The value to be set for the diagnosis interval 127 is determined based upon the driving operation start date/time point for the most recent driving operation and the driving operation start date/time point for the driving operation immediately preceding the most recent driving operation, included in the sets of drive diagnosis results read out in step 302. More specifically, the value to be set for the diagnosis interval 127 is determined by calculating the difference between the values stored in the fields in column 401 in FIG. 4, one corresponding to the most recent driving operation and the other corresponding to the driving operation immediately preceding the most recent driving operation.

The value to be set for the diagnosis in-use period 128 is determined based upon the driving operation start date/time point for the most recent driving operation and the driving operation start date/time point for the very first driving operation, included in the sets of drive diagnosis results read out in step 302. More specifically, the value to be set for the diagnosis in-use period 128 is determined by calculating the difference between the values stored in the fields in column 401 in FIG. 4, one corresponding to the most recent driving operation and the other corresponding to the very first driving operation.

The methods described above can be adopted when executing the processing in step 303, to determine the values to be stored for the score frequency 122, the score succession value 123, the score variance 124, the traveling time block 125, the continuous driving duration 126, the diagnosis interval 127 and the diagnosis in-use period 128.

Lastly, the central processing unit 110 updates the various types of information stored in the storage unit 120 in step 304 by storing the individual values obtained in step 303 for the score frequency 122, the score succession value 123, the score variance 124, the traveling time block 125, the continuous driving duration 126, the diagnosis interval 127 and the diagnosis in-use period 128 in the storage device 120.

Through the processing procedure described above, the center device 100 is able to create information needed to execute a drive diagnosis by taking into consideration the driver's skills, personal characteristics, experience and the like and store the information thus created into the storage device 120.

Next, a method that may be adopted at the terminal device 150 to provide drive diagnosis results to the driver will be explained. The terminal device 150 receives the diagnosis results 121 transmitted from the center device 100 in step 207 in FIG. 2, and then is able to provide the drive diagnosis results to the driver by engaging the drive diagnosis result display unit 192 in drive diagnosis screen display processing based upon the received drive diagnosis results 121. The following is a description of specific examples of drive diagnosis screens that may be brought up on display.

Figure 13:
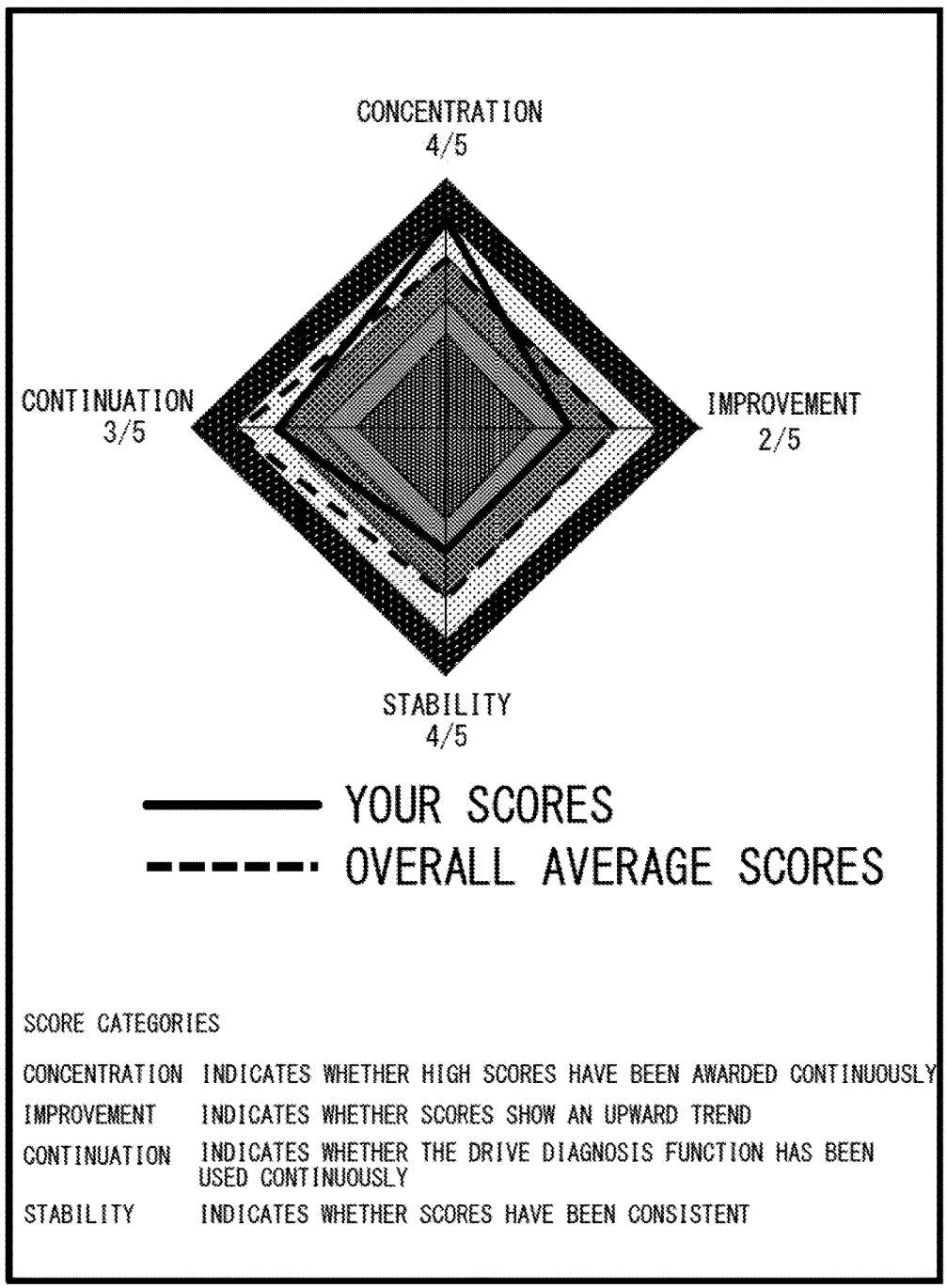
FIG. 13 presents an example of a drive diagnosis screen that may be brought up on display at the terminal device.

FIG. 13 presents an example of a drive diagnosis screen that may be brought up on display at the terminal device 150. In the drive diagnosis screen in FIG. 13 scores obtained based upon the driver's personal characteristics and experience for score categories such as concentration, improvement, continuation and stability are indicated on a graph in comparison to corresponding overall average values calculated by using scores awarded to other drivers as well.

FIG. 14 presents another example of a drive diagnosis screen that may be brought up on display at the terminal device 150. In the drive diagnosis screen in FIG. 14, a reliability score for the driving characteristics of the driver is indicated. In addition, score values determined based upon the driver's skills, personal characteristics, experience and the like are indicated in correspondence to specific score categories as further details.

Figure 15:
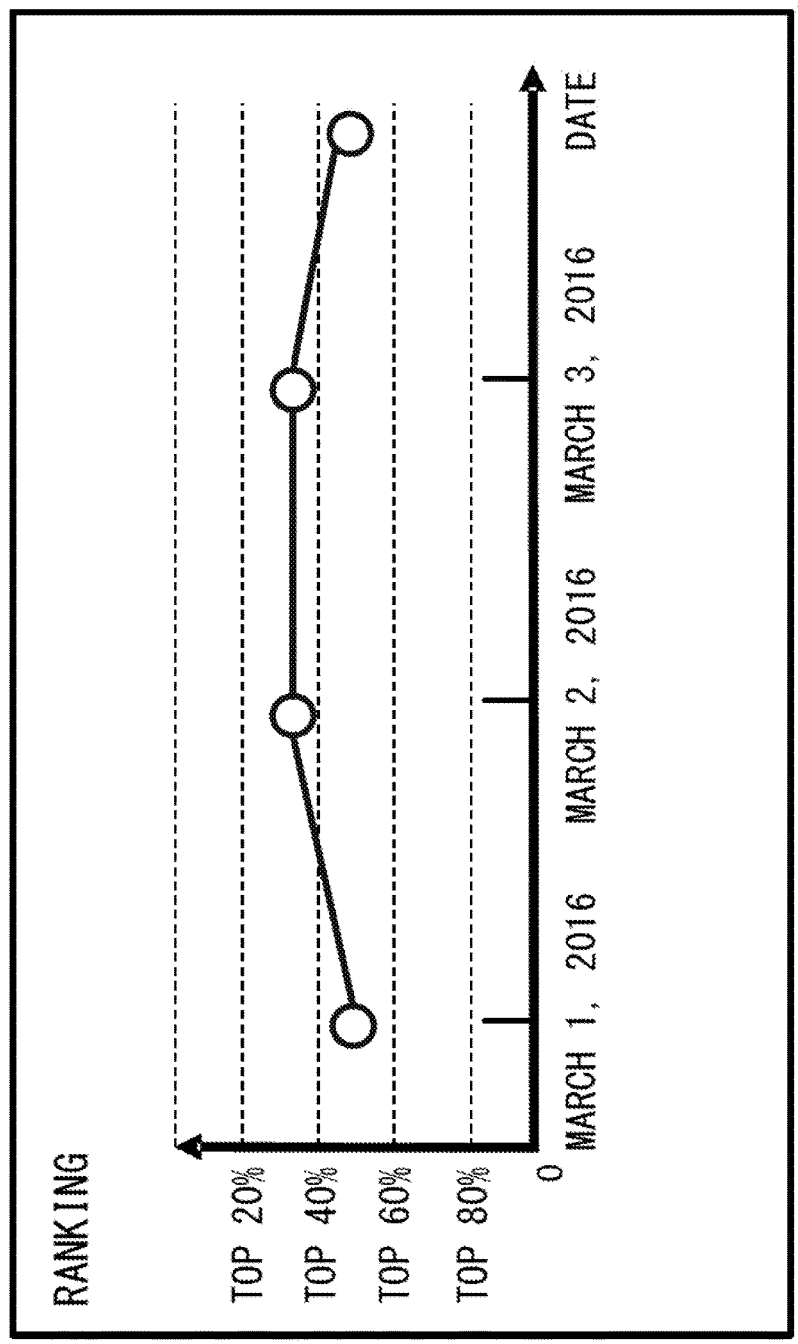
FIG. 15 presents yet another example of a drive diagnosis screen that may be brought up on display at the terminal device.

FIG. 15 presents yet another example of a drive diagnosis screen that may be brought up on display at the terminal device 150. In the drive diagnosis screen in FIG. 15, a graph indicating how the ranking of the score value representing the drive diagnosis results for the subject driver, among all users, has changed is displayed. In this graph, the date on which the vehicle was driven is indicated along the horizontal axis and the ranking of the score value awarded to the driver is indicated along the vertical axis. By viewing such a graph in the drive diagnosis screen, the driver is able to compare his driving ranking with those of other drivers, which is bound to raise his awareness for safe driving. It is to be noted that a driver's ranking in, for instance, a specific age group, a specific traveling time block or a specific traveling zone may be indicated, as well as the ranking in the entire user group.

Figure 16:
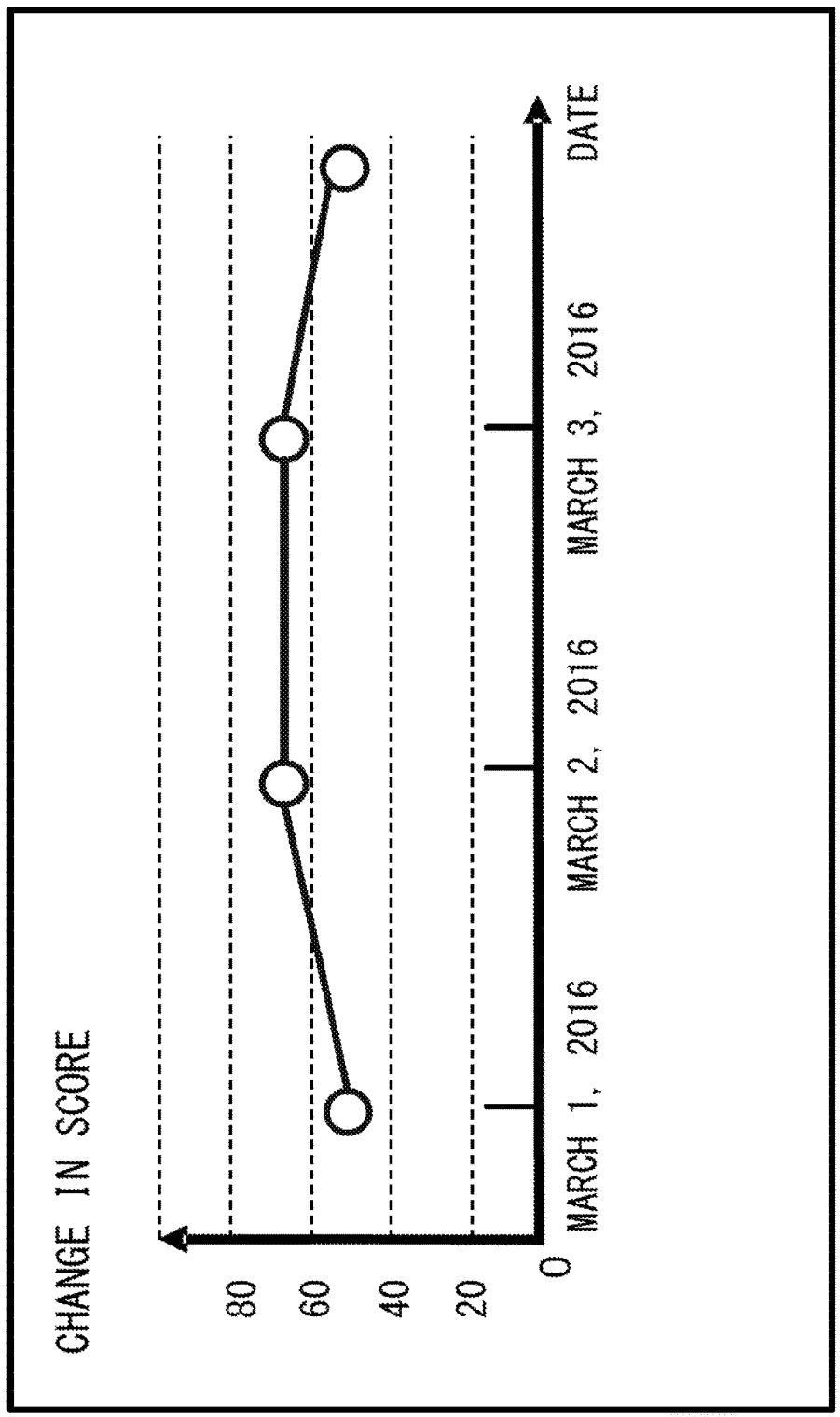
FIG. 16 presents yet another example of a drive diagnosis screen that may be brought up on display at the terminal device.

FIG. 16 presents yet another example of a drive diagnosis screen that may be brought up on display at the terminal device 150. In the drive diagnosis screen in FIG. 16, a graph indicating how the score value representing the drive diagnosis results obtained for that subject driver has changed is displayed. In this graph, the date on which the vehicle was driven is indicated along the horizontal axis and the score value awarded to the driver is indicated along the vertical axis. By viewing such a graph provided in the drive diagnosis screen, the driver is able to learn how his driving tendencies have changed, which is bound to improve his awareness for safe driving. It is to be noted that a change in the score in a specific traveling time block or a specific traveling zone may be indicated, as well as the change in the score through all the driving operations that have been performed.

It is to be noted that any of various drive diagnosis screens other than the drive diagnosis screens described in reference to FIGS. 13 through 16 can be brought up on display at the terminal device 150. In addition, a device other than the terminal device 150, such as a personal computer, may be connected to the center device 100 via the network 140 to display a drive diagnosis screens at the alternative device.

The following advantages and operations are achieved through the embodiment of the present invention described above.

(1) The center device 100, which functions as a drive-diagnosis device includes a storage device 120 where the travel records 129 providing travel records of a moving body embodied as a vehicle and the diagnosis results 121 that are information indicating the vehicle's past drive diagnosis results are stored, and a diagnosis processing unit 111 that executes a drive diagnosis based upon the skills of the vehicle driver, the personal characteristics of the driver and/or the experience of the driver by using the travel records 129 and the diagnosis results 121 stored in the storage device 120. This configuration makes it possible to improve the accuracy of drive diagnosis by taking into consideration the personal characteristics and/or the experience of the driver.

(2) The diagnosis processing unit 111, executing the drive diagnosis processing in step 204 in FIG. 2, determines the driver's skills based upon the travel records 129. The driver's skills can thus be determined with accuracy.

(3) The diagnosis processing unit 111 executing the drive diagnosis processing in step 205 in FIG. 2, determines the driver's personal characteristics based upon records of past drive diagnosis results obtained based upon the driver's skills. In more specific terms, the records of the past drive diagnosis results obtained based upon the driver's skills include at least one of; score frequencies each indicating the number of times a given score value representing drive diagnosis results was awarded over a predetermined past period, provided as the score frequency 122 in FIG. 5, succession values each indicating the number of times a score value was awarded successively over the predetermined past period, provided as the score succession value 123 in FIG. 6 and score variance indicating variance among the score values representing drive diagnosis results obtained over the predetermined past period, provided as the score variance 124 in FIG. 7, and the driver's personal characteristics are determined based upon such past drive diagnosis records. Through these measures, the personal characteristics of the driver can be determined with accuracy.

(4) The diagnosis processing unit 111, executing the drive diagnosis processing in step 205 in FIG. 2, determines the driver's personal characteristics based upon at least one of; vehicle operation frequency records, each indicating the number of times the vehicle was driven during a specific traveling time block, provided as the traveling time block 125 in FIG. 8, continuous driving duration records each indicating the length of time over which the vehicle was engaged in a driving operation, provided as the continuous driving duration 126 in FIG. 9, drive diagnosis interval records indicating intervals between individual drive diagnoses, provided as the diagnosis interval 127 in FIG. 10, and the age and gender of the driver. Through these measures, too, driver's personal characteristics can be determined with accuracy.

(5) The diagnosis processing unit 111, executing the drive diagnosis processing in step 205 in FIG. 2 determines the driver's experience based upon at least either the length of time the drive diagnosis has been in use or the number of times the drive diagnosis function was used, provided as the diagnosis in-use period 128 in FIG. 11. The level of driver experience can be thus determined with accuracy.

(6) The terminal device 150 brings up on display a diagnosis result screen providing the results of a drive diagnosis executed for the vehicle (moving body). This diagnosis result screen provides scores determined based upon the driver's personal characteristics and/or experience, as shown in FIGS. 13 and 14. Such a diagnosis result screen makes it possible to provide the driver with a viewer-friendly display of the drive diagnosis results obtained based upon the driver's personal characteristics and/or experience.

It is to be noted that while travel records for the subject vehicle obtained in the terminal device 150 are transmitted from the terminal device 150 to the center device 100, which then executes a drive diagnosis based upon the travel records in the embodiment described above, the drive diagnosis function of the center device 100 may instead be assigned to the terminal device 150. In such a case, the terminal device 150 not only obtains vehicle travel records but also creates and stores the various types of information such as those described in reference to FIGS. 4 through 12 and then executes a vehicle drive diagnosis based upon the stored information by executing the processing in the flowcharts in FIGS. 2 and 3. Namely, the central processing unit 190 in the terminal device 150 in this alternative configuration further comprises the diagnosis processing unit 111, the diagnosis result analysis unit 112, the diagnosis result transmission unit 113 and the travel record reception unit 114. In addition, the diagnosis results 121, the score frequency 122, the score succession value 123, the score variance 124, the traveling time block 125, the continuous driving duration 126, the diagnosis interval 127 and the diagnosis in-use period 128 are stored into the storage device 180. In this configuration, too, advantages and operations similar to those described above can be achieved.

Through the embodiment of the present invention described above, the accuracy of the drive diagnosis can be improved by taking into consideration the driver's personal characteristics and/or experience.

It is to be noted that the embodiment described above simply represents an example and the present invention is in no way limited to this example as long as the features characterizing the present invention remain intact. Any other mode conceivable within the technical range of the present invention should, therefore, be considered to fall within the scope of the present invention.

What is claimed is:

1. A drive diagnosis device, comprising:
 a storage device configured to store travel records of a moving body and past drive diagnosis results from past drive diagnoses executed for the moving body, wherein the travel records of the moving body are transmitted, via a network, from a terminal device in the moving body and are obtained based on signals outputted from a plurality of sensors including a gyro sensor, an azimuth sensor, and an acceleration sensor; and
 a hardware processor configured to execute a drive diagnosis based upon driver's skills of a driver for driving the moving body, personal characteristics of the driver, and experience of the driver by using the travel records and the past drive diagnosis results stored in the storage device, wherein the hardware processor determines the personal characteristics of the driver based on records of past drive diagnosis results including (i) a plurality of frequencies each indicating a number of times that a score value representing drive diagnosis results was awarded over a predetermined time period in the past, (ii) a plurality of succession values each indicating a number of times that a score value was successively awarded over the predetermined time period in the past, and (iii) a score variance indicating an extent of variance among score values representing the drive diagnosis results obtained over the predetermined time period in the past.

2. The drive diagnosis device according to claim 1, wherein:
the hardware processor determines the driver's skills based upon the travel records.

3. The drive diagnosis device according to claim 1, wherein:
the hardware processor determines the personal characteristics of the driver based on:
(i) records each indicating a number of times the moving body was driven during a traveling time block, (ii) records indicating durations of time over which the moving body was continuously driven, (iii) records indicating intervals between drive diagnoses, and (iv) an age and a gender of the driver.

4. The drive diagnosis device according to claim 1, wherein:
the hardware processor determines the experience of the driver based upon (i) a length of time over which the drive diagnosis has been in the use, and (ii) a number of times the drive diagnosis has been used.

5. A drive diagnosis system, comprising:
a terminal device configured to obtain information pertaining to travel of a moving body based on signals outputted from a plurality of sensors including a gyro sensor, an azimuth sensor, and an acceleration sensor; and
a center device comprising a hardware processor and configured to communicate with the terminal device via a communication line,
wherein the hardware processor of the center device is configured to:
receive, via a network, travel records pertaining to the moving body based upon the information from the terminal device;
store, in a storage device, the travel records of the moving body and past drive diagnosis results from past drive diagnoses executed for the moving body;
execute a drive diagnosis based upon driver's skills of a driver for driving the moving body, personal characteristics of the driver, and experience of the driver by using the travel records and the past drive diagnosis results stored in the storage device,
wherein the personal characteristics of the driver are determined based on records of past drive diagnosis results including (i) a plurality of frequencies each indicating a number of times that a score value representing drive diagnosis results was awarded over a predetermined time period in the past, (ii) a plurality of succession values each indicating a number of times that a score value was successively awarded over the predetermined time period in the past, and (iii) a score variance indicating an extent of variance among score values representing the drive diagnosis results obtained over the predetermined time period in the past; and
transmit results of the drive diagnosis to the terminal device; and
wherein the terminal device is configured to display the results of the drive diagnosis transmitted from the center device.

6. The drive diagnosis system according to claim 5, wherein the terminal device comprises a diagnosis result screen displaying a score value determined based upon the personal characteristics and/or the experience of the driver of the moving body.

7. A terminal device comprising:
a communication interface configured to receive information pertaining to travel of a moving body obtained based on signals outputted from a plurality of sensors including a gyro sensor, an azimuth sensor, and an acceleration sensor;
a storage device configured to store travel records pertaining to the moving body based upon the information received by the communication interface and past drive diagnosis results from past drive diagnoses executed for the moving body; and
a hardware processor configured to execute a drive diagnosis based upon driver's skills of a driver for driving the moving body, personal characteristics of the driver, and experience of the driver by using the travel records and the past drive diagnosis results stored in the storage device,
wherein the personal characteristics of the driver are determined based on records of past drive diagnosis results including (i) a plurality of frequencies each indicating a number of times that a score value representing drive diagnosis results was awarded over a predetermined time period in the past, (ii) a plurality of succession values each indicating a number of times that a score value was successively awarded over the predetermined time period in the past, and (iii) a score variance indicating an extent of variance among score values representing the drive diagnosis results obtained over the predetermined time period in the past,
wherein the communication interface is further configured to provide results of the drive diagnosis.

* * * * *